Patented June 30, 1936

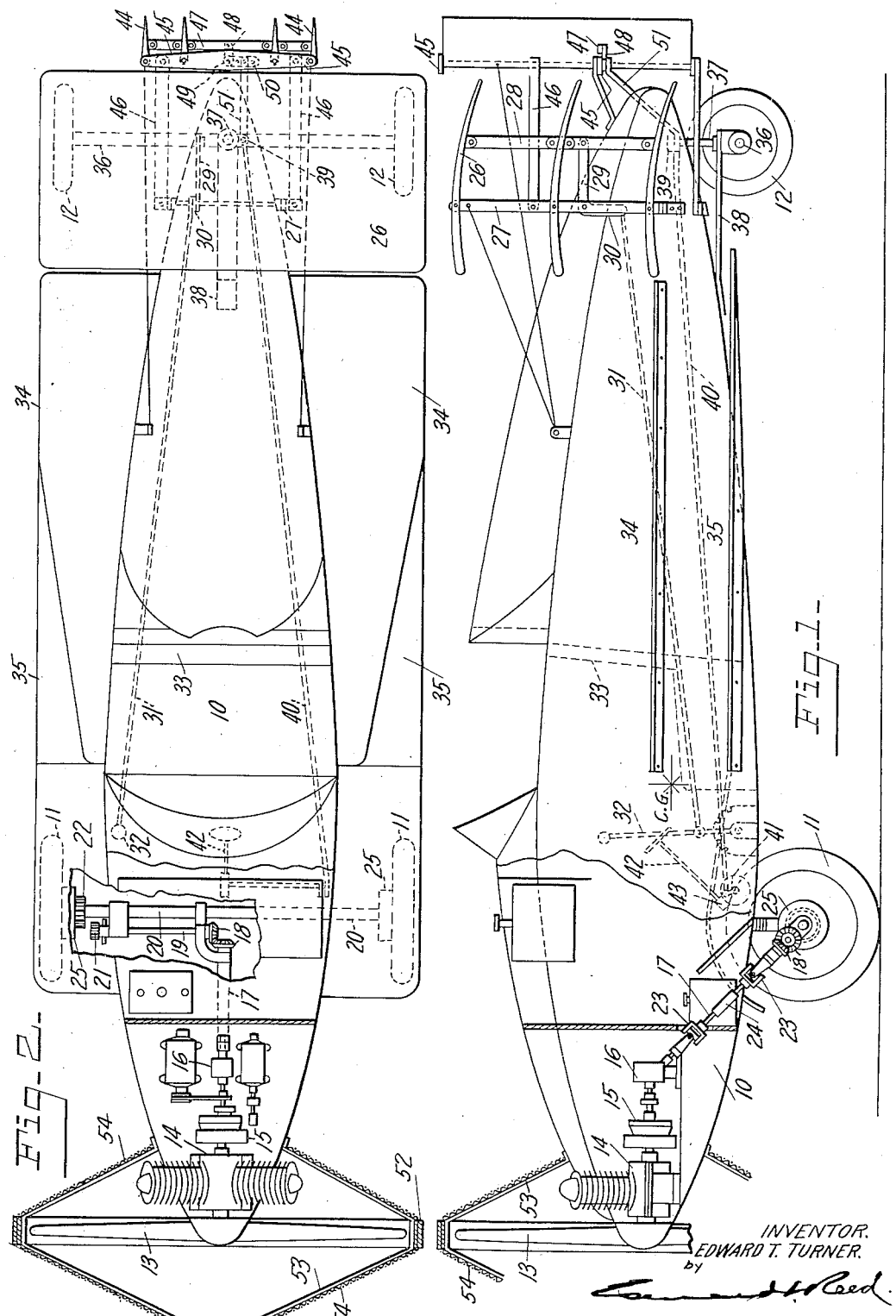

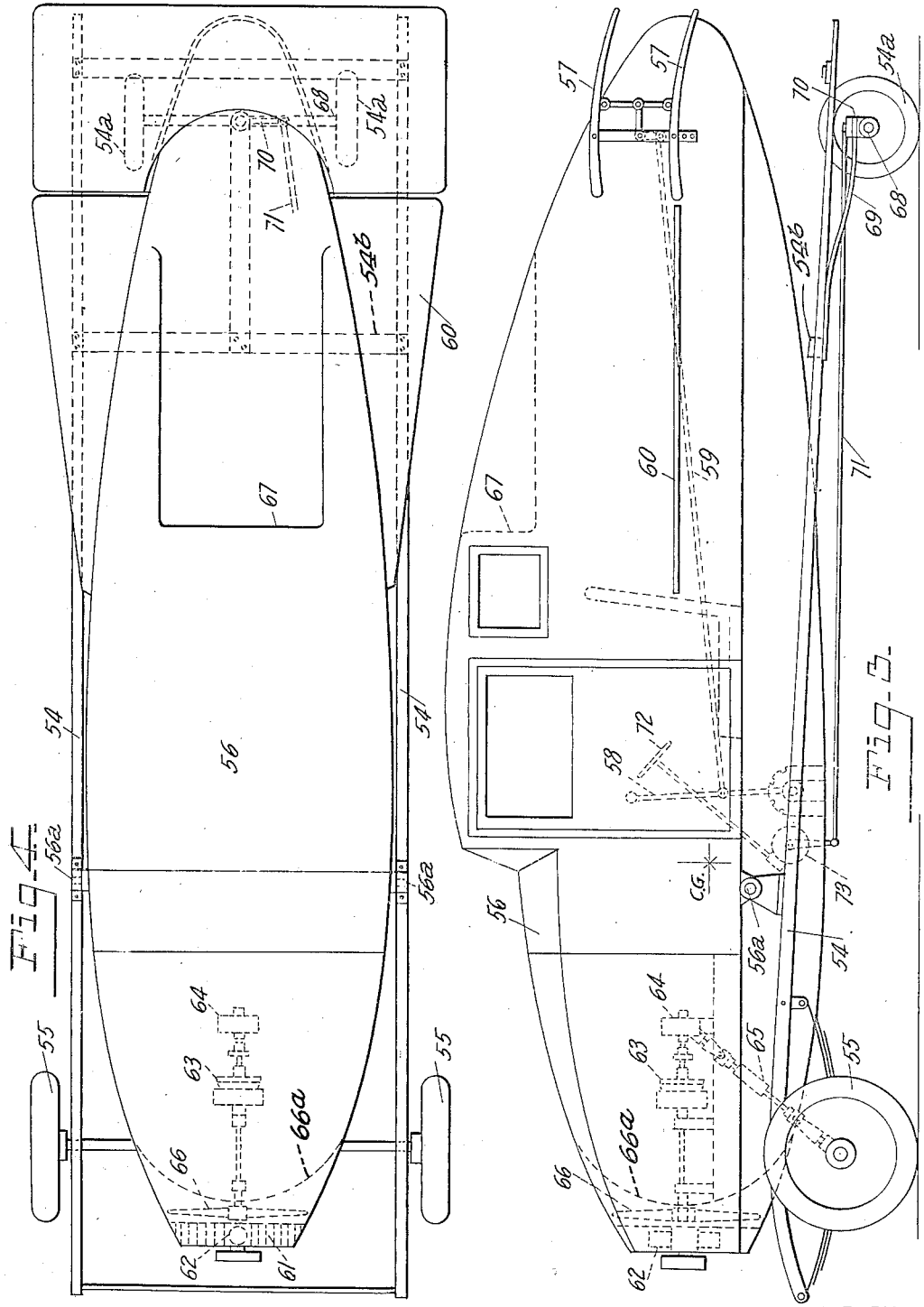

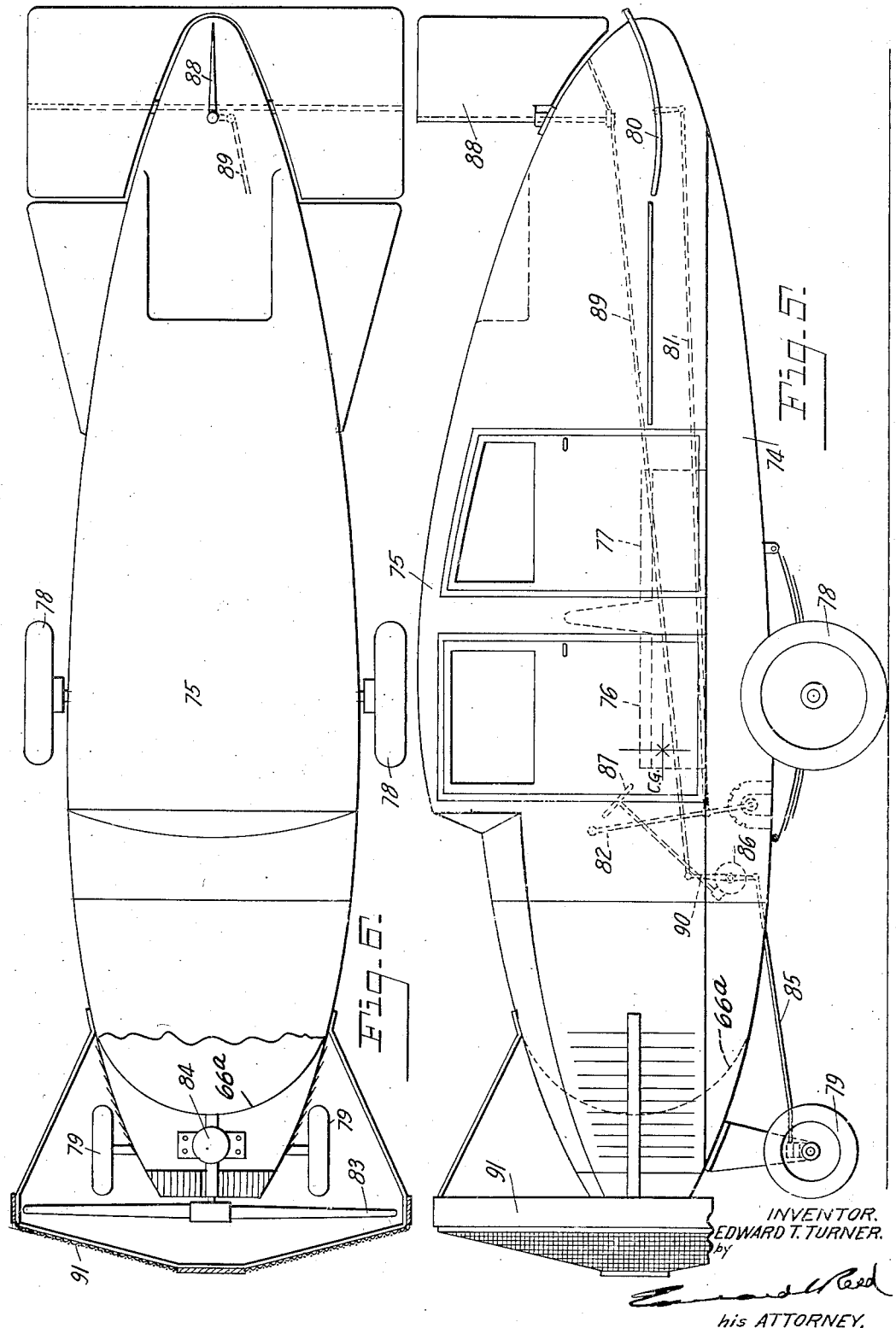

2,046,042

UNITED STATES PATENT OFFICE 2,046,042

AUTOMOBILE

Edward T. Turner, Dayton, Ohio

Application October 30, 1933, Serial No. 695,804

10 Claims. (Cl. 180—1)

This invention relates to an automobile, and more particularly to an automobile of that type in which the body is mounted for floating movement about a transverse axis, as shown in Patent No. 1,407,048, granted to me on February 21, 1922.

One object of the present invention is to provide an automobile of this type with improved construction which will provide a better control of the automobile.

A further object of the invention is to provide such an automobile in which the passenger seat will be so located with relation to the transverse axis about which the body moves and to the center of gravity of the body as to provide a very easy riding vehicle.

A further object of the invention is to provide such an automobile with means for controlling the elevation of the heavier end thereof.

A further object of the invention is to provide such an automobile with improved means for steering the same.

A further object of the invention is to provide such an automobile with improved means for driving the same rearwardly.

A further object of the invention is to provide an automobile with a full streamline body of such a character that there will be a minimum of air resistance to the movement of the automobile and the body will be of an attractive appearance.

Other objects of the invention will appear as the automobile is described in detail.

In the accompanying drawings, Fig. 1 is a side elevation, partly broken away, of an automobile embodying my invention; Fig. 2 is a plan view of such an automobile, partly in section; Fig. 3 is a side elevation of an automobile embodying the invention in a modified form; Fig. 4 is a plan view of the automobile of Fig. 3; Fig. 5 is a side elevation, partly broken away, of another embodiment of the invention; and Fig. 6 is a plan view of the embodiment shown in Fig. 5.

In these drawings, I have illustrated three embodiments of the invention, chosen for the purpose of illustration, all of which embody the same fundamental features of construction and operation but which differ one from the other in the details of construction and arrangement.

In that form of the invention shown in Figs. 1 and 2 the automobile comprises a body 10 supported by ground wheels 11 on which it travels. The body is so mounted on the wheels 11 that it may have pivotal movement about a transverse horizontal axis which may be either the axis of the wheels or the points of contact of the wheels with the road, as will be hereinafter explained. This axis is spaced from the vertical plane of the center of gravity of the body, as shown at C G in Fig. 1, and, in the present instance, the axis is in front of the center of gravity so that the rear portion of the body has the greater weight and will tend to move downwardly. This rear portion of the body is supported by wheels 12 when the automobile is at rest or moving at low speed. When the automobile is moving at high speeds the rear portion will be elevated as hereinafter described and the rear wheels lifted out of engagement with the ground, as shown in Fig. 1.

The automobile may be propelled in any suitable manner and in the form here shown it is provided at its forward end with an air propeller 13 which is driven by an internal combustion engine 14 mounted in the forward portion of the body and, in the present instance, the engine is of the V-type with the cylinders projecting outwardly beyond the body. This air propeller imparts forward movement to the automobile and reverse movement may be imparted thereto in any suitable manner. If desired, a reversible propeller may be employed as shown in the patent hereinbefore mentioned, but in the construction shown I have applied power to the wheels 11 to drive the automobile rearwardly. As shown the motor 14 is connected by a clutch 15 with gearing, not shown but enclosed in the casing 16, and this gearing is connected by a shaft 17 and gears 18 with a shaft 19 mounted on the axle 20 which carries the wheels 11 and having on one end thereof a gear 21 which is slidable into and out of engagement with a gear 22 secured to one of the wheels, the wheel being rotatable on the axis. Obviously the shaft may be connected with both wheels if desired. The shaft 17 is provided with universal joints 23 and a longitudinal extensible joint 24 to enable it to accommodate itself to the movements of the front end of the body with relation to the axle. The clutch and transverse gearing may be controlled by the usual or any suitable devices, which are not here shown. It will be apparent that by the use of proper transmission gearing power may be applied to the wheels 11 to drive the automobile either forwardly or rearwardly. Ordinarily this mechanism will be used for rearward driving only but in some instances, when it is desired to propel the automobile at low speed, as when parking, it may be preferable to use the wheel forward drive. The wheels may be provided with brakes of any suitable character but inasmuch as the brakes and their operating mechanism form no part of the invention I have shown only the brake drums, at 25.

The body may be mounted on the wheels for movement about a transverse horizontal axis in any suitable manner. In the arrangement shown in Figs. 1 and 2 the body is rigidly mounted on the axle and when the driving gears 21 and 22 are disengaged this axle may have rocking movement with relation to the wheels and the transverse axis will be the axis of the wheels. When the driving gears are engaged the axle is held against the rocking movement with relation to the wheels and the body will fulcrum about the points of contact of the wheels 11 with the road and these points of contact will define the transverse axis. This transverse axis is here shown as spaced a substantial distance in front of the vertical plane of the center of gravity. The distance between the axis and the center of gravity will be determined, in part at least, according to the characteristics of each automobile embodying the invention, but the center of gravity should be far enough back of the transverse axis to prevent excessive downward movement of the front end of the body, or nose diving, when the brakes are suddenly applied, but it is also desirable that the center of gravity should be as close as practicable to the axis to avoid too great an excess of weight in the rear portion of the body as compared with the front portion of the body.

The rear portion of the body has secured thereto one or more transverse planes 26 to elevate the same when the automobile is moved at a relatively high speed. It will be understood that when initial forward movement is imparted to the automobile it will travel on the four wheels, 11 and 12, and as it gains speed the action of the air on the elevator planes 26 will lift the rear portion of the body, about the transverse axis, and will support the same in mid air, with the wheels 12 out of engagement with the road, for floating movement about said transverse axis. There may be one or more of these elevator planes 26 and, in the present instance, I have shown three planes arranged one above the other so as to secure the necessary lifting action without the use of an excessively large plane. These elevating planes are adjustable to vary the angle of incidence and thus regulate the lifting action, according to the load or other conditions of operation. After the body has been elevated and as the automobile attains high speed it will often be desirable to reduce the angle of incidence to avoid excessive elevation of the body. In the arrangement here shown the several elevator planes are mounted on fixed axes on an upright frame 27 mounted on the body near the rear end thereof. The several planes are connected one to the other in the rear of their fixed axes by a vertically movable actuating bar 28, which is preferably made up of a series of links pivotally connected with the respective planes. Any suitable means under the control of the operator may be provided for imparting vertical movement to this bar and thus changing the angles of incidence of the planes. As here shown, the actuating bar 28 is pivotally connected with one arm 29 of a bell crank lever which is pivotally mounted on the upright frame 27 and the other arm 30 of which is connected by a rod 31 with a controlling lever 32 mounted in front of the passenger seat which is shown at 33. I also prefer to provide the rear portion of the body with one or more stabilizing planes which will prevent too rapid movement of the body under the influence of the elevator planes. In the present construction, I have mounted two stabilizing planes 34 and 35 on each side of the body and have arranged the same one above the other. In this arrangement these planes may be used by the driver as steps in entering or leaving the body.

When the automobile is traveling at low speed and all four wheels are on the road it may be steered by either the front wheels 11 or the rear wheels 12 but with the arrangement here shown I prefer to utilize the rear wheels 12 for steering. For this purpose the axle 36 which carries the rear wheels is secured to a vertical shaft 37 rotatably mounted on a bracket 38 rigidly secured to the rear portion of the body. Secured to this vertical shaft 37 is a crank arm 39 which is connected by a rod 40 with a crank arm 41 which in turn is connected with a steering wheel 42 by the usual worm gearing 43 or in any suitable manner. When the rear wheels have been lifted out of engagement with the road the automobile is steered by a vertical rudder and I prefer that the rudder shall comprise a plurality of vertical planes, as shown at 44, in order to secure proper air surfaces without making the rudder unduly large. In the present instance the rudder consists of four vertical planes which are pivotally mounted at their upper and lower ends on fixed axes in a frame 45 mounted on bars or struts 46 extending rearwardly from the upright frame 27 and from the body. The vertical planes of the rudder are connected one to the other by a transversely movable bar 47, preferably formed of links pivotally connected with the respective vertical planes and so arranged that the longitudinal movement of this transverse bar will impart pivotal movement to the several planes about their vertical axes. The movement of the rudder is preferably controlled by the same steering mechanism that controls the steering wheels 12 and, in the arrangement shown, the bar 47 is pivotally connected with one arm 48 of a bell crank lever pivotally mounted at 49 on the frame 45 and the other arm 50 of that lever is connected by a link 51 with the crank arm 39 on the vertical shaft 37 of the rear steering wheels.

I prefer that the body should be of full streamline contour so that there will be a minimum of air resistance to the movement of the automobile. As shown the front and rear portions of the body are tapered forwardly and rearwardly, respectively, from an intermediate transverse plane which in the present instance is arranged between the transverse axis and the vertical plane of the center of gravity. The front and rear portions of the lower surface of the body are curved upwardly from points adjacent to said transverse plane and the front and rear portions of the upper surfaces of the body are curved downwardly so that the respective surfaces converge forwardly and rearwardly toward an intermediate horizontal plane at the respective ends of the body. The lateral surfaces of the body also converge forwardly and rearwardly, as shown in Fig. 2. As a result both end portions are tapered substantially to points lying in an intermediate longitudinal line.

The propeller 13 is enclosed in a cage or frame mounted on the front end of the body. This cage comprises an annular frame member 52 extending about the propeller and has secured thereto a plurality of pairs of converging frame members 53 which support front and rear walls 54 of foraminous material, such as coarse mesh wire fabric. The rear members 53 of each pair are rigidly secured to the body and serve to rigidly support the guard frame or cage thereon.

When the body of the automobile is of sufficient height to provide a closed passenger compartment, or cab, the lateral surfaces of the body which are exposed to air currents are so large that it is frequently difficult to steer the automobile at high speed by the rudder, this being particularly true in a high cross wind. I have therefore shown in Figs. 3 and 4 an embodiment of the invention in which the body is supported on four wheels at all speeds but is mounted for floating movement about a transverse horizontal axis. In this construction the automobile comprises a frame 54 supported at its front end by driving wheels 55 and at its rear end by steering wheels 54a. The body 56 is pivotally mounted on the frame, as shown at 56a, this pivotal mounting being some distance in front of the center of gravity of the body. The rear portion of the body is supported on the frame when the automobile is at rest or moving at low speed, as by a transverse frame member 54b and is provided with elevator planes 57 which are connected with an adjusting lever 58 by a rod 59 substantially as described in connection with Fig. 1. The body also has on each side thereof a transverse stabilizing plane 60. This form of the automobile may be driven either by an air propeller or by a wheel drive but I have here illustrated it as having a wheel drive only. As shown in the drawings the body 56 has mounted in the forward end thereof a radiator 61 which is provided with an opening in which is mounted a small motor 62 of a well known type. This motor is connected through a clutch 63, transmission gearing 64 and shaft 65 with the front wheels 55, and serves to drive the automobile both forwardly and rearwardly. Mounted in the rear of the radiator is a cooling fan 66 and in the rear of the fan the body is provided with a streamline partition 66a which, as here shown, comprises approximately a sector of a sphere and serves to divert the air which passes through the radiator and to minimize the resistance of that air to the forward movement of the automobile. The body 56 is of streamline contour and conforms generally to the contour of the body shown in Fig. 1. However, the intermediate or cab portion is somewhat higher than the front portion of the body to provide a front view window for the driver. The rear portion curves from a point above the cab downwardly and rearwardly to the rear end of the body where it meets the upwardly curved lower surface of the body, but a portion of this upper surface between the sides thereof may be depressed, as shown at 67, thus providing the cab with space for a rear window. While either the front or the rear wheels may be used for steering purposes I prefer to employ the rear wheels for that purpose and the axle 68 which carries the rear wheels 54a is mounted on a rearwardly extending bracket or bar 69 which is rigidly secured at its forward end to the frame 54 and has its rear end spaced below that frame. This bar is preferably resilient and also functions as a spring. The axle is pivotally mounted on the bar for movement about a vertical axis and has connected therewith a crank arm 70 which is connected by a rod 71 with the steering wheel 72 through the usual steering connections, as shown at 73.

While it is usually preferable that the heavier end of the body should be in the rear of the transverse axis this is not necessary to the operation of the machine and in Figs. 5 and 6, I have shown an arrangement in which the front end of the body is the heavier end. In these figures the body 74 is of the general streamline construction shown in Figs. 3 and 4 and is provided with an intermediate cab portion 75, of the sedan type, and having therein two seats 76 and 77 arranged back to back so as to place the passengers in the rear seat as far forward as possible. This body is supported on wheels 78 which are arranged approximately midway between the front and rear ends of the body and the mounting is such that the body may move either about the axis of the wheels or about the points of contact of the wheels with the road, as described in connection with Figs. 1 and 2, and this axis is arranged to the rear of the center of gravity. The forward portion of the body is provided with wheels 79 arranged to support the same when the automobile is at rest or moving at low speed. The rear portion of the body has mounted thereon an elevator plane 80 so arranged that the action of the air thereon will depress the rear end of the body and thus elevate the heavier front end. This plane is adjustable and is connected by a rod 81 with the adjusting lever 82. The automobile may be propelled either by an air propeller or by a wheel drive in the manner heretofore described but it is here shown as provided with an air propeller 83 which is driven from a motor 84. When the automobile is moving at low speed it is steered by the front wheels which are connected by a rod 85 with a crank arm 86 which in turn is connected with the steering wheel 87. At high speeds the automobile is steered by a vertical rudder 88 which is connected by a rod 89 with a crank arm 90 also connected with the steering wheel 87 but extending in a direction opposite the crank arm 86, the arrangement being such that the steering wheels and the rudder will be actuated simultaneously but in opposite directions. The propeller is preferably mounted in a cage or guard frame 91 mounted on the front end of the body in much the same manner as above described.

It will be apparent that with any of the embodiments which have been described the automobile may be easily controlled at both low speeds and high speeds and that the body will float about its transverse axis when the automobile is moving at high speeds, thus providing an easy riding comfortable vehicle. The extent of the elevation of the body is under the control of the operator and may be maintained substantially uniform at all speeds after it has once been elevated. The passenger seats being arranged in the rear of the transverse axis will have a gentle rising and falling movement as the body floats and will not be materially affected by contact of the ground wheels with irregularities in the road. The mechanism as a whole is inexpensive and of light weight and can be produced at a relatively low cost. Because of the character of the propelling mechanism and the light weight of the vehicle it can be operated with a minimum of power and at small expense.

While I have shown and described one embodiment of my invention, together with certain modifications thereof, I wish it to be understood that I do not desire to be limited to the details thereof as various modifications may occur to a person skilled in the art.

Having now fully described my invention, what

I claim as new and desire to secure by Letters Patent, is:

1. In an automobile, a frame extending lengthwise of said automobile and comprising side members spaced one from the other, wheels connected with the respective ends of said frame and serving at all times to support the same, an elongate body extending lengthwise of said frame with its lower portion between and below said side members, means for pivotally mounting said body between its ends on said frame for free oscillatory movement about a transverse axis extending through said body and in front of the transverse vertical plane of the center of gravity of said body, means for propelling and steering said automobile, means for limiting the downward movement of the rear end of said body, and an elevator plane connected with said body to elevate and support the rear end thereof when said automobile is moving at high speed, said body being free to move with relation to said frame in either direction about said transverse axis under the influence of said elevator plane when said rear end is elevated.

2. In an automobile, a frame extending lengthwise of said automobile and comprising side members spaced one from the other, wheels connected with the respective ends of said frame and serving at all times to support the same, an elongate body extending lengthwise of said frame with its lower portion between and below said side members, means for pivotally mounting said body between its ends on said frame for free oscillatory movement about a transverse axis extending through said body, means for propelling and steering said automobile, means for limiting the downward movement of the heavier end of said body, and an elevator plane connected with said body to elevate and support the heavier end thereof when said automobile is moving at high speed, said body being free to move with relation to said frame in either direction about said transverse axis under the influence of said elevator plane when said heavier end is so elevated.

3. In an automobile, a frame extending lengthwise of said automobile and comprising side members spaced one from the other, wheels connected with the respective ends of said frame and serving at all times to support the same, an elongate body extending lengthwise of said frame, means for pivotally mounting said body on said frame for free oscillatory movement between said side members and about a transverse axis spaced from the transverse vertical plane of the center of gravity of said body, means for limiting the downward movement of the heavier end of said body, means for propelling and steering said automobile, and an elevator plane connected with said body to elevate the heavier end thereof when said automobile is moving at high speed and so support said heavier end that said body will have free movement with relation to said frame in either direction about said transverse axis under the influence of said elevator plane.

4. In an automobile, a frame extending lengthwise of said automobile, wheels connected with the respective ends of said frame and serving at all times to support the same, an elongate body extending lengthwise of said frame, means for pivotally mounting said body on said frame for free oscillatory movement with relation to said frame about a transverse axis arranged between the ends of said body and in front of the transverse vertical plane of the center of gravity of said body, said frame having means for limiting the downward movement of the rear end of said body, an elevator plane connected with said body to elevate and support the rear end thereof when said automobile is moving at high speed, said pivotal mounting constituting the sole means for supporting said body on said frame when said rear end is so elevated and said body being then free to move in either direction about said transverse axis under the influence of said elevator plane, and means for propelling and steering said automobile.

5. In an automobile, a frame extending lengthwise of said automobile, wheels connected with the respective ends of said frame and serving at all times to support the same, an elongate body extending lengthwise of said frame, means for pivotally mounting said body on said frame for free oscillatory movement about a transverse axis spaced from the transverse vertical plane of the center of gravity of said body, means for propelling and steering said automobile, means carried by said frame for limiting the downward movement of the heavier end of said body when said automobile is stationary or moving at low speed, and an elevator plane connected with said body to elevate and support the heavier end thereof when said automobile is moving at high speed, said pivotal mounting constituting the sole means for supporting said body on said frame when said end is so elevated and said body being then free to move with relation to said frame in either direction about said transverse axis under the influence of said plane.

6. In an automobile, a frame extending lengthwise of said automobile, wheels connected with the respective ends of said frame and serving at all times to support the same, an elongate body mounted between its ends on the forward portion of said frame for free pivotal movement about a transverse axis, means to limit the downward movement of the free end of said body, means for propelling and steering said automobile, and an elevator plane connected with said body to elevate one end thereof with relation to said frame and to support the same when said automobile is in motion, said pivotal mounting constituting the sole means for supporting said body on said frame when said end is so elevated and said body being then free to move about its pivotal axis under the influence of said plane.

7. In an automobile, a frame extending lengthwise of said automobile, wheels connected with the respective ends of said frame and serving at all times to support the same, a body extending lengthwise of said frame, means for pivotally mounting said body on said frame for free oscillatory movement with relation to said frame about a transverse axis arranged between the ends of said body, means for propelling and steering said automobile, an elevator plane connected with said body to elevate one end thereof when said automobile is moving at high speed and to so support said end that said body may have oscillatory movement with relation to said frame in either direction about said transverse axis under the influence of said elevator plane, said pivotal mounting constituting the sole means for supporting said body on said frame when said end is so elevated.

8. In an automobile, a frame extending lengthwise of said automobile, wheels connected with the respective ends of said frame and serving at all times to support the same, a body extending lengthwise of said frame, means for pivotally mounting said body on said frame for free oscillatory movement with relation to said frame about a transverse axis arranged between the ends of said body, means for propelling and steering said automobile, an elevator plane connected with said body to elevate one end of said body when said automobile is moving at high speed and to so support said end that said body may have free oscillatory movement with relation to said frame in either direction about said transverse axis under the influence of said elevator plane, said pivotal mounting constituting the sole means for supporting said body on said frame when said end is so elevated, and a part carried by said frame to limit the downward movement of said end of said body when said automobile is moving at low speed or is at rest.

9. In an automobile, a frame extending lengthwise of said automobile, wheels connected with the respective ends of said frame and serving at all times to support the same, a body extending lengthwise of said frame, means for pivotally mounting said body on said frame for free oscillatory movement about a transverse axis extending through said body above the bottom thereof, means for propelling and steering said automobile, and an elevator plane connected with said body to elevate one end thereof when said automobile is moving at high speed and to so support said end that said body may have oscillatory movement with relation to said frame in either direction about said transverse axis under the influence of said elevator plane, said pivotal mounting constituting the sole means for supporting said body on said frame when said end is so elevated.

10. In an automobile, a frame extending lengthwise of said automobile, wheels connected with the respective ends of said frame and serving at all times to support the same, a body extending lengthwise of said frame, said frame having parts extending upward on opposite sides of said body to points above the bottom thereof, means for pivotally mounting said body on parts of said frame for free oscillatory movement about a transverse axis, means for propelling and steering said automobile, and an elevator plane connected with said body to elevate one end thereof when said automobile is moving at high speed and to so support said end that said body may have oscillatory movement with relation to said frame in either direction about said transverse axis under the influence of said elevator plane, said pivotal mounting constituting the sole means for supporting said body on said frame when said end is so elevated.

EDWARD T. TURNER.